US010565029B1

(12) United States Patent
Klemenz

(10) Patent No.: US 10,565,029 B1
(45) Date of Patent: Feb. 18, 2020

(54) AUTOMATICALLY INTEGRATING APPLICATIONS VIA AN INTEGRATION DISCOVERY SERVICE

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/217,666

(22) Filed: Dec. 12, 2018

(51) Int. Cl.
*G06F 9/54* (2006.01)
*G06K 19/06* (2006.01)
*G06F 16/242* (2019.01)
*G06F 9/445* (2018.01)

(52) U.S. Cl.
CPC .......... *G06F 9/541* (2013.01); *G06F 9/44505* (2013.01); *G06F 16/2423* (2019.01); *G06K 19/06028* (2013.01)

(58) Field of Classification Search
None
See application file for complete search history.

(56) References Cited

U.S. PATENT DOCUMENTS

| 2006/0133412 A1* | 6/2006 | Callaghan ................. G06F 9/54 370/465 |
| 2016/0216947 A1* | 7/2016 | Hassibi ................. H04L 51/046 |
| 2016/0302056 A1* | 10/2016 | Sheng ..................... H04W 4/06 |
| 2016/0357540 A1* | 12/2016 | Allgeier .................. G06F 9/541 |
| 2016/0358354 A1* | 12/2016 | Alli ....................... G06F 16/258 |

\* cited by examiner

*Primary Examiner* — Umut Onat
(74) *Attorney, Agent, or Firm* — Sterne, Kessler, Goldstein & Fox P.L.L.C.

(57) ABSTRACT

Disclosed herein are system, method, and computer program product embodiments for automatically integrating different software applications in a cloud platform. An embodiment operates by creating a registration entry representing an integration use-case for a first tenant of a first application in an integration discovery service. The embodiment generates a barcode based on the registration entry. The embodiment matches the integration use-case for the first tenant of the first application with a potential integration use-case for a second tenant of a second application based on the barcode. The embodiment then creates an integration configuration for enabling the integration use-case for the first tenant of the first application with the potential integration use-case for the second tenant of the second application based on the matching.

20 Claims, 4 Drawing Sheets

AUTOMATICALLY INTEGRATING APPLICATIONS VIA AN INTEGRATION DISCOVERY SERVICE

BACKGROUND

The software industry is increasingly transitioning away from monolithic software applications to software applications structured as a collection of loosely coupled services. The software industry is also increasingly transitioning away from software applications deployed on customer premises to software applications deployed in a cloud platform. As a result, customers are increasingly utilizing the services of software applications deployed in a cloud platform.

The deployment of these types of software applications to a cloud platform reduces the amount of system administration performed by customers. Rather a cloud provider handles system administration, and their customers focus on the software application services they want to consume.

But customers still want a way to integrate various software applications deployed to a cloud platform. The ability to integrate different software applications is often key to customers solving various business requirements. But cloud providers are unable to provide a way for customers to automatically integrate software applications deployed on a cloud platform.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically integrating different software applications in the cloud.

Figure 1:
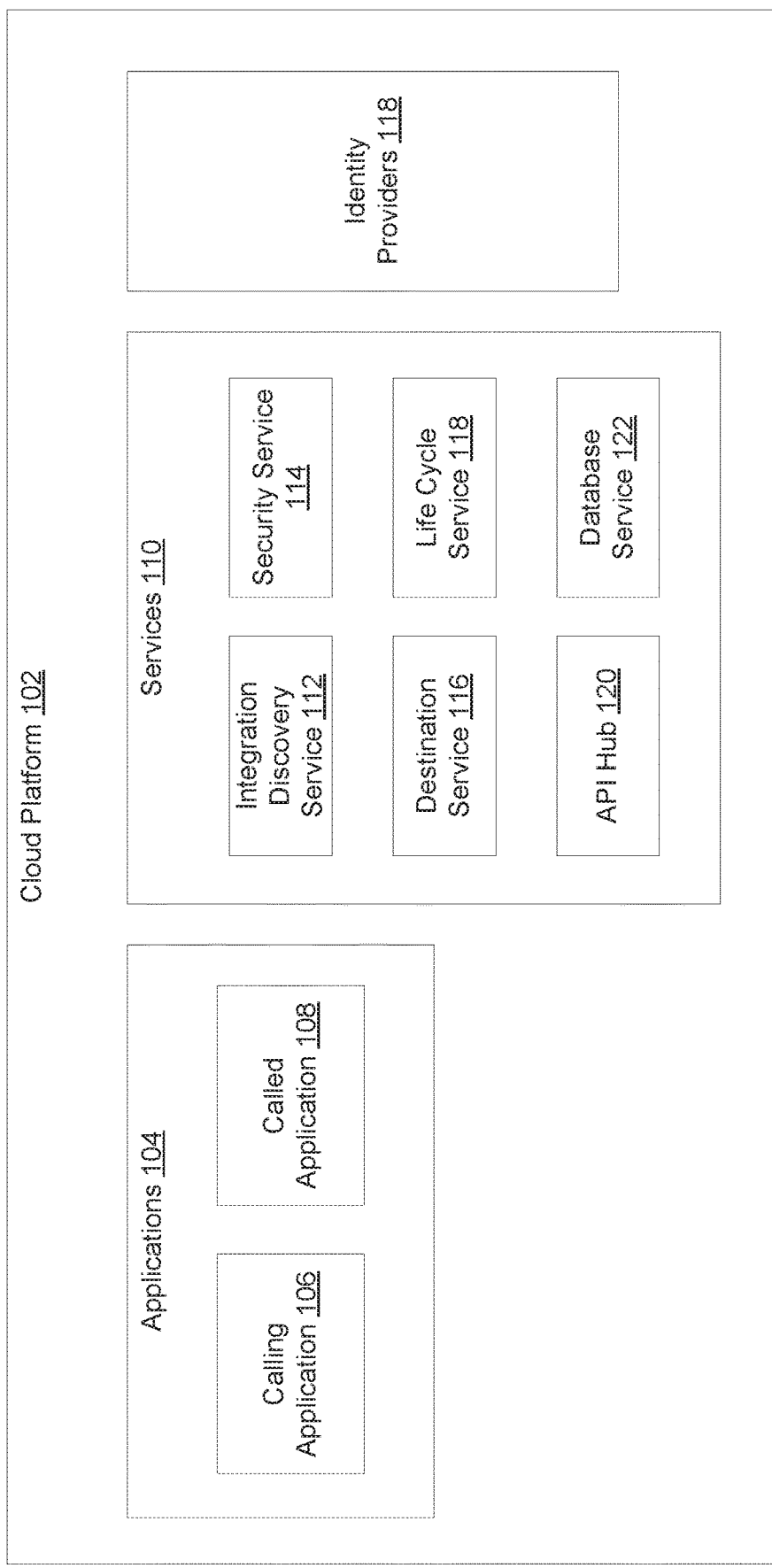
FIG. 1 is a block diagram of a cloud platform configured to automatically integrate different software applications, according to some embodiments.

FIG. 1 is a block diagram of a cloud platform 102 configured to automatically integrate different software applications, according to some embodiments. Cloud platform 102 can include applications 104, services 110, and identity providers 118.

Cloud platform 102 can be a cloud computing platform. Cloud platform 102 can run one or more software applications in applications 104. In FIG. 1, applications 104 can include calling application 106 and called application 108. Called application 108 can represent a software application that exposes one or more services for consumption by another software application. Calling application 106 can represent a software application that consumes one or more services exposed by another software application. In embodiments herein, cloud platform 102 can automatically integrate together calling application 106 and called application 108.

Cloud platform 102 can run the one or more software applications in applications 104 using a multitenancy software architecture. For example, cloud platform 102 can run a single instance of a software application that serves multiple tenants. A tenant can be a group of users that share access to a single instance of a software application. Cloud platform 102 can provide each tenant a dedicated share of a single instance of a software application. For example, cloud platform 120 can provide each tenant a dedicated share of data and configuration for a single instance of a software application.

The deployment of software applications to a cloud platform reduces the amount of system administration performed by customers utilizing the software applications. A cloud provider handles system administration, and the customers focus on the software application services they want to consume. But customers often want a way to integrate the various software applications deployed to the cloud platform.

To integrate two software applications on a cloud platform, an application programming interface (API), an endpoint, and security information can be established between the two software applications. An API can be a software interface that one software application provides, and which another software application consumes. For example, called application 108 can provide an API which calling application 106 can consume. An API can enable one software application to make its services available to another software application. An API can be based on the Open Data Protocol (OData) protocol, Simple Object Access Protocol (SOAP), REpresentational State Transfer (REST) protocol, or other protocol as would be appreciated by a person of ordinary skill in the art.

An API may need to be configured between two software applications at runtime. This is because there can be multiple instances of the two software applications having different customer specific configurations. As a result, there may not be a way to integrate the two software applications via the API at the time of application development or application deployment.

In addition, to integrate two software applications, an endpoint can be exposed by one of the two software applications. An endpoint can be a uniform resource locator (URL) that represents a set of data and services accessible using an API from a software application. The set of data and services accessible from the software application can be associated with a particular tenant.

Finally, to integrate two software applications, security information can be established between the two software applications. For example, a cloud platform can authenticate a tenant of one of the two software applications that is attempting to consume the services of the other software application. The cloud platform can also determine whether the tenant is permitted to consume certain services of the other software application.

Conventional cloud platforms do not provide a way to automatically integrate software applications deployed in the cloud. Rather, conventional cloud platforms may force customers to manually integrate software applications deployed in the cloud. This is often error prone. In addition, this may result in the exposure of sensitive technical integration details directly to customers.

In some embodiments, cloud platform 102 can solve these technological problems by automatically integrating different software applications. By way of example, and not limitation, embodiments herein are described with respect to the integration of calling application 106 and called application 108

In some embodiments, a customer can buy calling application 106 and called application 108 from a provider of cloud platform 102. The provider can then provide access to calling application 106 and called application 108 to the customer. As would be appreciated by a person of ordinary skill in the art, calling application 106 and called application 108 can be any type of application providing any type of functionality. For example, calling application 106 can be a sales management application and called application 108 can be an accounting application.

A customer can directly use the functionality provided by either calling application 106 or called application 108. For example, a customer can insert and modify sales transactions in calling application 106. However, a customer may also want to integrate the functionality of called application 108 with calling application 106. For example, the customer may want to generate an invoice using called application 108 from a sales record in calling application 106. In other words, the customer may want calling application 106 to consume the functionality provided by called application 108. This can enable the customer to solve various business requirements that cannot be solved directly using any single application.

In some embodiments, to enable the automatic integration of calling application 106 and called application 108 by cloud platform 102, the customer can first register one or more tenants for calling application 106 and called application 108 in cloud platform 102. A tenant can be a group of users who share access to a single instance of a software application (e.g., calling application 106 or called application 108). Cloud platform 102 can provide each tenant a dedicated share of a single instance of a software application. For example, cloud platform 120 can provide each tenant a dedicated share of data and configuration for a single instance of a software application.

In some embodiments, in response to registering the tenants, cloud platform 102 can trigger a tenant onboarding process for both calling application 106 and called application 108. Cloud platform 102 can use life cycle management service 118 to perform the tenant onboarding process.

In some embodiments, life cycle service 118 can utilize various life cycle functions in a software application to perform the tenant onboarding process for that software application. As would be appreciated by a person of ordinary skill in the art, the software application can be modified to support various life cycle functions.

In some embodiments, life cycle service 118 can trigger a life cycle function in a software application (e.g., calling application 106 or called application 108) that creates a schema for a tenant of the software application in database service 122. The schema can include data specific to the tenant for use during operation of the software application.

In some embodiments, database service 122 can be a service in cloud platform 102 that provides access to an underlying database. As would be appreciated by a person of ordinary skill in the art, the underlying database can be a relational database, flat database, object database, or other type of database.

In some embodiments, life cycle service 118 can trigger a life cycle function in a software application (e.g., calling application 106 or called application 108) that registers the software application's supported integration use-cases in integration discovery service 112 for a tenant. An integration use-case can define how the software application provides a particular service for consumption by another software application, or consumes a particular service provided by another software application.

Life cycle service 118 can cause the life cycle function in the software application that registers the software application's supported integration use-cases to register different information depending on the software application's role.

In some embodiments, a software application can be configured in a provider or consumer role. A software application configured as a provider can provide a particular service for consumption by another software application. Such an application can be referred to as a called application. In embodiments herein, called application 108 can act as a provider. A software application configured as a consumer can consume a service provided by a provider software application. Such an application can be referred to as a calling application. In embodiments herein, calling application 106 can act as a consumer.

In some embodiments, life cycle service 118 can register an integration use-case of a software application configured as a provider in integration discovery service 112. Life cycle service 118 can register various information as part of an integration use-case for a software application configured as a provider for a tenant. The registration can include a provided API. The provided API can describe an interface for exposing a particular service of the provider software application (e.g., called application 108). In other words, the provided API represents a particular integration use-case.

In some embodiments, the provided API can include an API identifier and an API version. The API identifier can be published in API hub 120. API hub 120 can be a service in services 110. API hub 120 can lookup information about a particular API based on an API identifier.

The API identifier can identify the particular API in API hub 120. In other words, the API identifier can abstract way the service description (e.g., the service being provided or consumed) and implementation details of the particular API (e.g., implemented via SOAP) Cloud platform 102 can use an API identifier to wire a particular service being exposed by called application 108 with calling application 106.

API version can identify the particular version of the API being used to provide or consume the service. An API version can be included in a registration with integration discovery service 112 because the API may evolve overtime. For example, to ensure that called application 108 and calling application 106 can talk to one another, both applications may need to know the API version of the API being used.

In some embodiments, the registration can include a provided endpoint. The provided endpoint can be a URL that can be called by one software application (e.g., calling application 106) to consume a service (e.g., represented by an integration use-case) exposed by another software application (e.g., called application 106). The provided endpoint can represent a set of data and functionality specific to the tenant of the application exposing the integration use-case.

In some embodiments, the registration can include a supported security type. As discussed above, to call a service exposed by one software application (e.g., called application 108), cloud platform 102 may need to authenticate the tenant of the other calling software application (e.g., calling application 106). In some embodiments, this authentication process can be performed by the software application being called (e.g., called application 108). In some other embodiments, this authentication process can be performed by an identify provider in identify providers 118.

An identity provider in identify providers 118 can offer user authentication service. The identity provider can create, maintain, and manage identify information for users. The identity provider can also provide authentication services to third party software applications (e.g., calling application 106).

In some embodiments, the supported security type can be basic authentication. Basic authentication can involve providing a username and password to the software application exposing a service (e.g., called application 108).

In some other embodiments, the supported security type can be based on Open Authorization (OAuth). In OAuth authentication, a software application exposing a service (e.g., called application 108) can ensure another software application consuming that service (e.g., calling application 106) is authenticated by having the software application consuming the service authenticate to an identify provider in identity providers 118.

In some embodiments, the registration can include a supported logon type. The supported logon type can be based on a technical user with global privileges. For example, a software application exposing a service (e.g., called application 108) can authenticate another software application consuming that service (e.g., calling application 106) based on a common user having global privileges. In other words, each user of a tenant of a software application consuming a service can use a common user to authenticate to the software application exposing the service.

In some other embodiments, the supported logon type can be based on a named user. For example, user information for each user of a tenant of a software application consuming a service (e.g., calling application 106) is propagated to the software application exposing the service (e.g., called application 108). This can enable each user of the tenant of the software application consuming the service to be provided different authorizations to the software application exposing the service (e.g., called application 108).

In some embodiments, the registration can include additional security settings. For example, the registration can include authorization flows based on OAuth flows. The registration can also include Security Assertion Markup Language mappings.

In some embodiments, the registration can include a primary user identifier. As would be appreciated by a person of ordinary skill in the art, primary user identifier can be an alphanumeric identifier, an email address, or other type identifier as would be appreciated by a person of ordinary skill in the art.

In some embodiments, the registration can include one or more mappings. The mappings can include mappings based on user or attributes. The mappings can also include assignments based on role or group.

In some embodiments, the registration can include one or more scopes. The scopes can define what a user of a tenant of a software application that consumes a service (e.g., calling application 106) is allowed to do at the software application exposing the service (e.g., called application 108), and what the user is not allowed to do.

In some embodiments, life cycle service 118 can register an integration use-case of a software application configured as a consumer in integration discovery service 112.

Life cycle service 118 can register various information as part of an integration use-case for a software application configured as a consumer for a tenant. The registration can include an API to be consumed. The API to be consumed can describe an interface for consuming a particular service exposed by a provider software application (e.g., called application 108). In other words, the API to be consumed represents a particular integration use-case.

In some embodiments, the API to be consumed can be represented by an API identifier and an API version as discussed above. The API identifier can be published in API hub 120.

In some embodiments, the registration can include an accepted security type. The accepted security type can be basic authentication. The accepted security type can also be based on OAuth.

In some embodiments, the registration can include an accepted logon type. The accepted logon type can be based on a technical user with global privileges. The accepted logon type can also be based on a named user.

In some embodiments, the registration can include additional security settings. For example, the registration can include different authorization flows based on OAuth flows. The registration can also include Security Assertion Markup Language mappings.

In some embodiments, the registration can include one or more complementary mappings. The complementary mappings can include mappings based on user or attributes. The complementary mappings can also include assignments based on role or group.

In some embodiments, the registration can include one or more existing scopes. The existing scopes can define what a user of a tenant of a software application that consumes a service (e.g., calling application 106) is allowed to do, and what the user is not allowed to do.

In some embodiments, after life cycle service 118 creates a registration entry for a tenant in integration discovery service 112 for each integration use-case of a software application, integration discovery service 112 can generate a barcode based on the registration entry. In some embodiments, integration discovery service 112 can generate a matrix barcode based on the registration entry. For example, integration discovery service 112 can generate a QR code based on the registration entry.

In some embodiments, the generated barcode can represent the information stored in the registration entry. For example, the generated barcode can be used to identify, for a registration entry of a software application configured as a provider, the provided API and the provided endpoint. The generated barcode can also be used to identify the supported security type, supported logon type, additional security settings, primary user identifier, mappings, and scopes. As would be appreciated by a person of ordinary skill in the art, the generated barcode can identify similar information in a registration entry of a software application configured as a consumer. Moreover, as would be appreciated by a person of ordinary skill in the art, integration discovery service 112 can generate the barcode representing the registration entry using various techniques.

In some embodiments, a customer (or integrator) interested in triggering automatic integration of two software application by cloud platform 102, can view the generated barcode for a registration entry of a software application by opening an application integration page of the software application. The application integration page can display a generated barcode for each integration use-case for a tenant of the software application.

Figure 2:
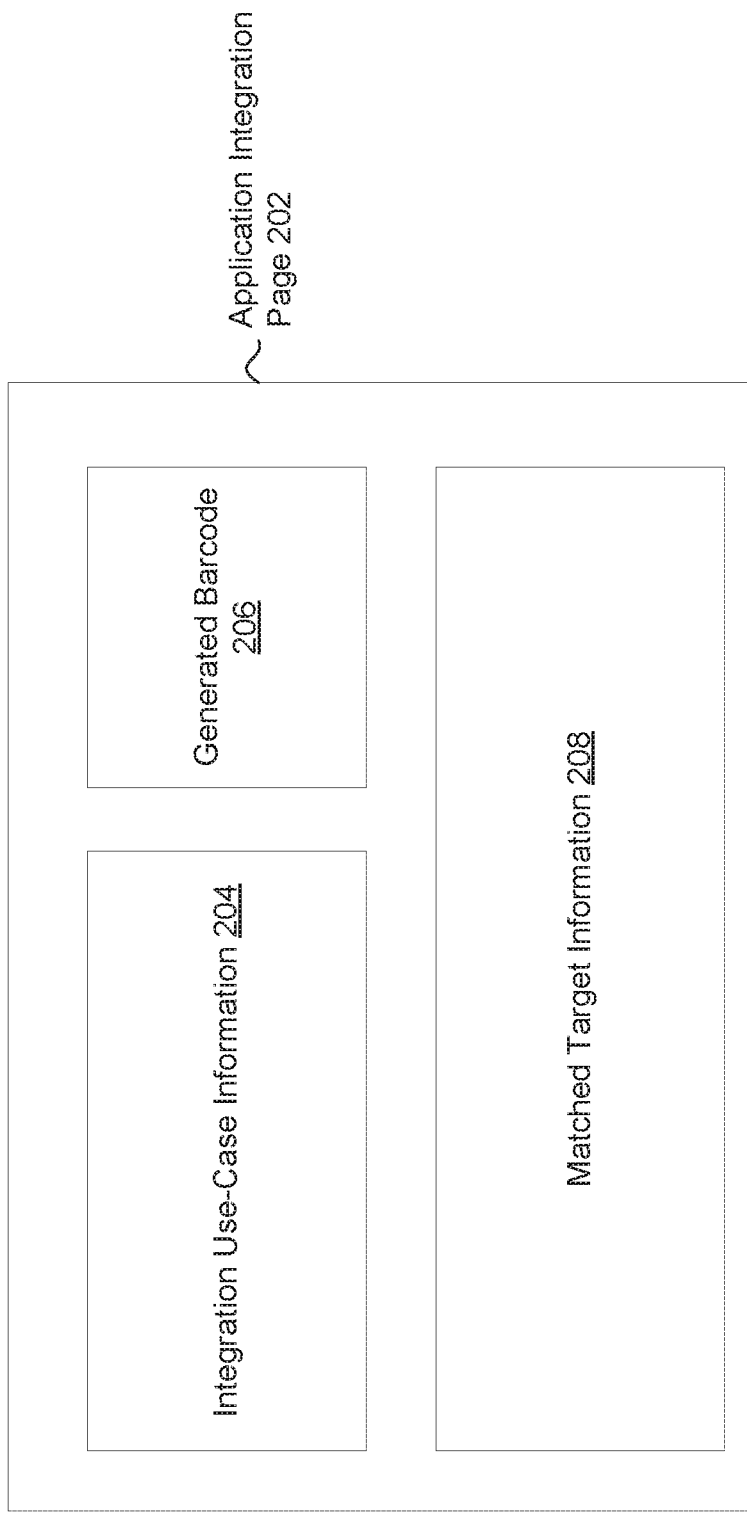
FIG. 2 is an example illustrating an application integration page of a software application, according to some embodiments.

FIG. 2 is an example illustrating an application integration page 202 of a software application, according to some embodiments. By way of example, and not limitation, application integration page 202 is described as an application integration page for calling application 106 in FIG. 1. However, application integration page 202 can be an application integration page for called application 108 or any other software application in applications 104. Application integration page 202 can include integration use-case information 204, generated barcode 206, and matched target information 204.

In FIG. 2, integration use-case information 204 can display information about one or more integration use-cases for a tenant of a software application (e.g., calling application 106). Integration use-case information 204 can display the name of the software application (e.g., calling application 106) and the associated tenant. For each integration use-case of the software application, integration use-case information 204 can display the API identifier and API version associated with the particular integration-use case. Integration use-case information 204 can also display whether the associated integration use-case is for the software application configured as a provider (e.g., called application 108) or a consumer (e.g., calling application 106).

In some embodiments, an integrator can display different integration use-cases for a tenant of the software application in integration use-case information 204. The different integration-use cases can be retrieved from those registered in integration discovery service 112.

In some embodiments, the integrator can select different integration use-cases via a drop down box. Upon selection of a different integration use-case, integration use-case information 204 can display the associated information for that particular integration use-case (e.g., the name of the software application, the associated tenant, etc.)

In FIG. 2, generated barcode 206 can display the generated barcode associated with the selected integration use-case in integration use-case information 204. As discussed above, generated barcode 206 can be unique to the selected integrated use-case and can represent the associated registration entry for the selected integrated use-case.

In FIG. 2, matched target information 208 can include information about a matching integration use-case of a software application that is configured for integration with the software application associated with application integration page 202 (e.g., calling application 106). For example, the matching software application can be called application 108.

In some embodiments, an integrator can match an integration use-case for a tenant of a first application with a potential integration use-case for a tenant of a second software application using the generated barcode associated with the integration use-case for the first application. By way of example, and not limitation, the integrator can match an integration use-case for a tenant of calling application 106 with a potential integration use-case for a tenant of called application 108. For example, in some embodiments, the integrator can open application configuration page 202 for calling application 106. Application configuration page 202 can display one or more integration use-cases for calling application 106. These one or more integration use-cases can be retrieved from the registrations in integration discovery service 112. The integrator can then select one of the integration use-cases for calling application 106. This can cause the application configuration page 202 to display the corresponding generated barcode 206 for the selected integration use-case.

The integrator can use the generated barcode 206 for the selected integration use-case to match calling application 106 to a software application configured as a provider and that provides a matching integration use-case (e.g., called application 108). For example, the integrator can open the application configuration page 202 of called application 108. The integrator can then scan the generated barcode 206 for the selected integration use-case of calling application 106 in the corresponding application configuration page 202 of called application 108.

In some other embodiments, the integrator can save the generated barcode 206 for the selected integration use-case of calling application 106 displayed in the corresponding application configuration page 202. The integrator can then open the application configuration page 202 of called application 108. The integrator can then upload the saved generated barcode 206 to the application configuration page 202 of called application 108. The integrator may perform this matching process where they are using a desktop computer or device without camera.

While the above example describes the integrator triggering the matching process by scanning (or uploading) generated barcode 206 at the application configuration page 202 of the software application configured as a provider, the integrator can also trigger the matching process by scanning (or uploading) a generated barcode 206 for the software application configured as a provider at the application configuration page 202 of the software application configured as a consumer.

In some embodiments, in response to scanning (or uploading) the generated barcode 206 to the application configuration page 202 of the software application configured as a provider (e.g., called application 108), the integration discovery service 112 can determine whether the software application configured as a provider can provide the associated integration use-case to the software application configured as a consumer (e.g., calling application 106). In other words, the integration discovery service 112 can determine whether the integration use-case of the software application configured as a provider is compatible with a potential integration use-case of the software application configured as a consumer. For example, the integration discovery service 112 can determine whether both the software application configured as a consumer and the software application configured as a provider support the same API, have counterpart roles, support the same security type, and support the same logon type. Integration discovery service 112 can also determine whether the potential integration use-case of the tenant of the software application configured as a consumer has scopes that meet the required scopes of the tenant of the integration use-case of the software application configured as a provider. Integration discovery service 112 can also determine whether both the software application configured as a consumer and software application configured as a provider support additional security settings, and whether the mappings of the software application configured as a consumer satisfy the mappings of the software application configured as a provider.

In some embodiments, in response to determining a match between an integration use-case for a tenant of a software application configured as a consumer (e.g., calling application 106) and a potential integration use-case for a tenant of a software application configured as a provider (e.g., called application 108), integration discovery service 112 can create an integration configuration for enabling the integration use-case of the tenant of the software application configured as a consumer (e.g., calling application 106) with the potential integration use-case of the tenant of the software application configured as a provider (e.g., called application 108).

In some embodiments, as part of creating the integration configuration, integration discovery service 112 can use destination service 116 to establish a destination configuration at the software application configured as a consumer (e.g., calling application 106) for accessing the software application configured as a provider (e.g., called application 108) for their matching integration use-cases. The destination configuration can represent a logical abstraction of an endpoint for accessing the software application configured as a provider (e.g., called application 108) for a matching integration use-case. The destination configuration can include a name, a type, an endpoint, and various security settings for accessing the software application configured as a provider. The destination configuration can be addressed in code by a name, and can be resolved during runtime to a concrete address using destination service 116. Integration discovery service 112 can establish the destination configuration from a previously performed integration match, and the associated integration use-case registered in integration discovery service 112.

In some embodiments, as part of creating the integration configuration, integration discovery service 112 can use security service 114 to establish security for the destination configuration. Security service 114 can configure various security settings for the destination configuration to protect the associated endpoint by authorization and authentication. Security service 114 can make manual security configuration unnecessary by exchanging the security settings automatically via integration discovery service 112.

In some embodiments, as part of creating the integration configuration, integration discovery service 112 can use security service 114 to generate an OAuth client for the software application configured as a provider (e.g., called application 108). Integration discovery service 112 can then register the generated OAuth client with the destination configuration for the software application configured as a provider. As would be appreciated by a person of ordinary skill in the art, integration discovery service 112 can generate and register the OAuth client according to the OAuth standard.

In some embodiments, as part of creating the integration configuration, integration discovery service 112 can use security service 114 to update authentication and authorization information based on the associated integration use-case registration and the matching. For example, integration discovery service 112 can update user and attribute mappings. Integration discovery service 112 can also update role and group assignments. Integration discovery service 112 can also update scopes (e.g., in OAuth authentication).

In some embodiments, as part of creating the integration configuration, integration discovery service 112 can use security service 114 to configure a trust configuration for enabling integration between the software application configured as a consumer (e.g., calling application 106) and the software application configured as a provider (e.g., called application 108). For example, integration discovery service 112 may configure a trust configuration when multiple identity providers are being used during integration. For example, the software application configured as a consumer (e.g., calling application 106) may use a first identity provider and software application configured as a provider (e.g., calling application 108) may use a second identify provider. To securely connect calling application 106 to called application 108, a trust configuration may need to be established. In other words, for calling application 106 and called application 108 to securely connect (e.g., using an OAuth connection), identity provider of called application 108 can be configured to trust the identity provider of calling application 106.

In some embodiments, the integrator of calling application 106 and called application 108 may not be the administrator of the identity providers of both applications. To configure a trust configuration between the identity providers of both applications, the administrators of each identity provider can be assigned a task. The task can involve approving or declining a trust configuration between the two identify providers. This can involve the administrator of each identity providers clicking an approve button to approve a trust configuration between both identity providers.

In some embodiments, after establishing the integration configuration between the software application configured as a consumer (e.g., calling application 106) and the software application configured as a provider (e.g., called application 108), the software application configured as a consumer can trigger an API runtime call to the software application configured as a provider. This can cause the execution of the associated integration use-case via the established integration configuration.

Figure 3:
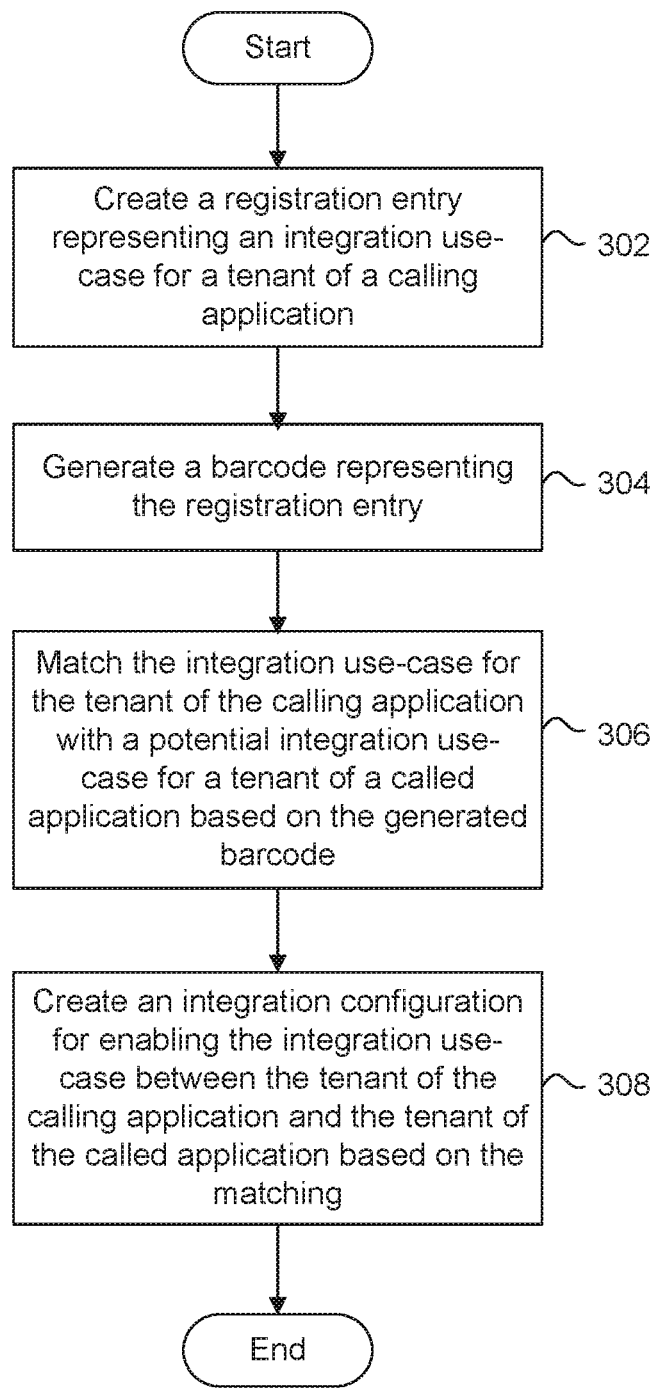
FIG. 3 is a flowchart illustrating a process for automatically integrating different software applications, according to some embodiments.

FIG. 3 is a flowchart for a method 300 for automatically integrating different software applications, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment. Method 300 shall be described with respect to automatically integrating calling application 106 with called application 108 from the perspective of calling application 106. However, as would be appreciated by a person of ordinary skill in the art, method 300 can also be described from the perspective of called application 108.

In 302, integration discovery service 112 creates a registration entry representing an integration use-case for a tenant of calling application 106. The registration entry can include an API to be consumed, an accepted security type, an accepted logon type, additional security settings such authorization flows, complementary mappings, and existing scopes. The API to be consumed can include an API identifier and an API version.

In 304, integration discovery service 112 generates a barcode representing the registration entry. The generated barcode can identify the API to be consumed, the accepted security type, the accepted logon type, the additional security settings, the complementary mappings, and the existing scopes associated with the integration use-case for the tenant of calling application 106. The generated barcode can a matrix barcode such as a QR code.

In 306, integration discovery service 112 matches the integration use-case for the tenant of calling application 106 with a potential integration use-case of a tenant of called application 108 based on the generated barcode. In some embodiments, the integration discovery service 112 can determine whether the integration use-case for the tenant of calling application 106 is compatible with the potential integration use-case of the tenant of called application 108. For example, integration discovery service 112 can determine whether the tenant of calling application 106 and the tenant of called application 108 support the same API, have counterpart roles, support the same security type, and support the same logon type for the integration use-case. In some embodiments, integration discovery service 112 can perform the matching in response to an integrator scanning the generated barcode representing the registration entry for calling application 106 into an application configuration page of called application 108. In some other embodiments, integration discovery service 112 can perform the matching in response to the integrator uploading a saved copy of the generated barcode representing the registration entry for calling application 106 into an application configuration page of called application 108.

In 308, integration discovery service 112 creates an integration configuration for enabling the integration use-cases between the tenant of calling application 106 and the tenant of the called application 108 based on the matching.

In some embodiments, as part of creating the integration configuration, integration discovery service 112 can establish a destination configuration at calling application 106 for accessing called application 108 for the integration use-case. The destination configuration can include a name of the destination configuration, a type, an endpoint, and various security settings for accessing called application 108 from calling application 106.

In some embodiments, as part of creating the integration configuration, integration discovery service 112 can generate an OAuth client for called application 108. Integration discovery service 112 can then register the generated OAuth client with the destination configuration for called application 108.

In some embodiments, as part of creating the integration configuration, integration discovery service 112 can configure a trust configuration for enabling integration between calling application 106 and called application 108. For example, integration discovery service 112 may configure a trust configuration when multiple identity providers are being used during integration.

Figure 4:
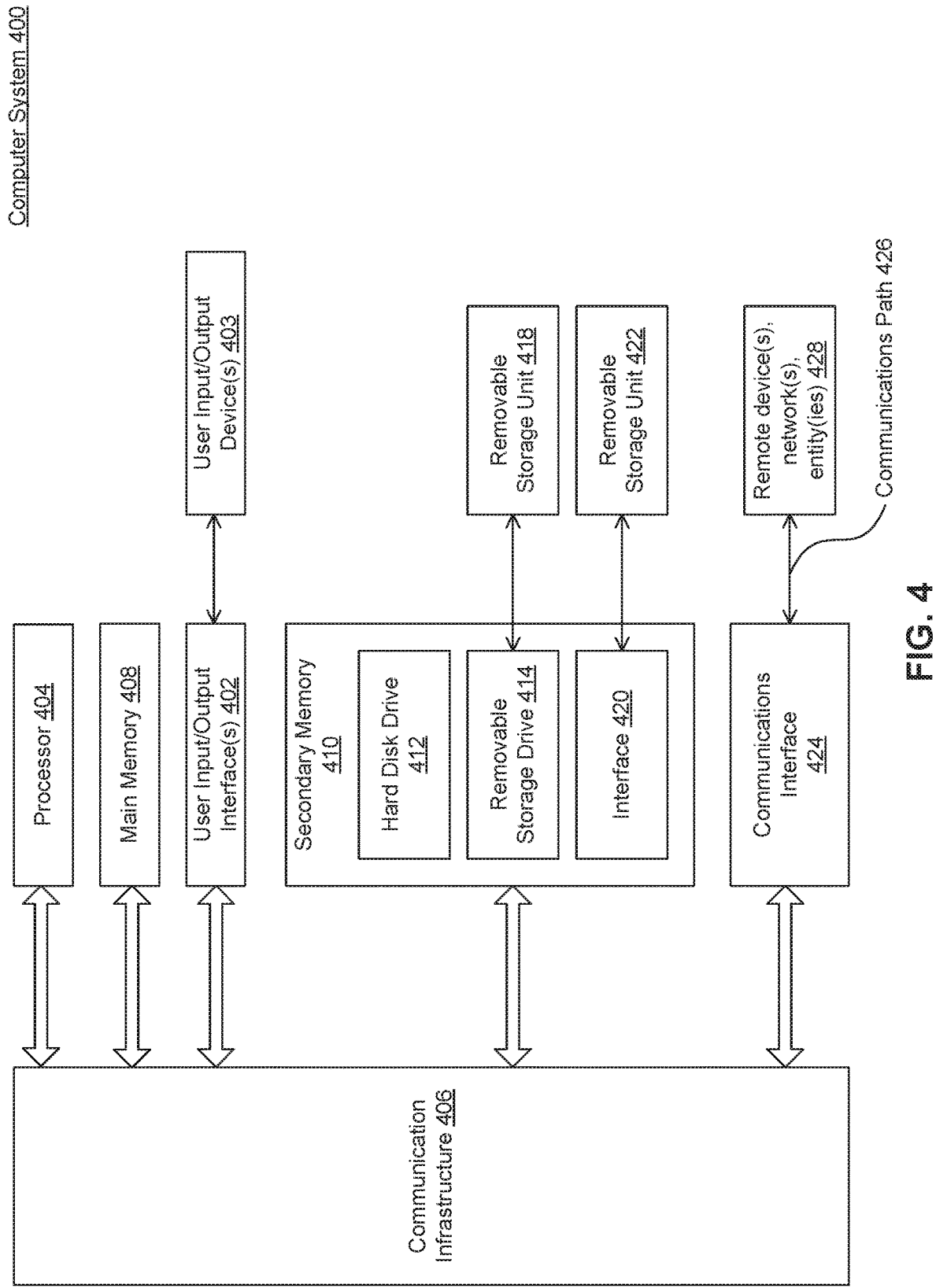
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for integrating applications, comprising:
    creating, by at least one processor, a registration entry representing an integration use-case for a first tenant of a first application in an integration discovery service;
    generating, by the at least one processor, a barcode based on the registration entry;
    matching, by the at least one processor, the integration use-case for the first tenant of the first application with a potential integration use-case for a second tenant of a second application based on the barcode; and
    creating, by the at least one processor, an integration configuration for enabling the integration use-case for the first tenant of the first application with the potential integration use-case for the second tenant of the second application based on the matching.

2. The method of claim 1, further comprising:
    creating a schema for the first tenant of the first application in a database service associated with the first tenant of the first application.

3. The method of claim 1, further comprising:
    registering a list of integration use-cases for the first application in the integration discovery service.

4. The method of claim 1, wherein the integration use-case for the first tenant of the first application represents an application programming interface (API) provided by the first tenant of the first application or an API to be consumed by the first tenant of the first application.

5. The method of claim 1, wherein the first tenant of the first application performs the integration-use case for the first tenant of the first application with the potential integration use-case for the second tenant of the second application based on the integration configuration.

6. The method of claim 1, the creating further comprising:
    creating a destination configuration for the first tenant of the first application for performing the integration-use case for the first tenant of the first application with the potential integration use-case for the second tenant of the second application based on the integration configuration.

7. The method of claim 1, the matching further comprising:
    determining that the integration use-case for the first tenant of the first application is compatible with the potential integration-use case for the second tenant of the second application.

8. A system, comprising:
    a memory; and
    at least one processor coupled to the memory and configured to:
        create a registration entry representing an integration use-case for a first tenant of a first application in an integration discovery service;
        generate a barcode based on the registration entry;

match the integration use-case for the first tenant of the first application with a potential integration use-case for a second tenant of a second application based on the barcode; and create an integration configuration for enabling the integration use-case for the first tenant of the first application with the potential integration use-case for the second tenant of the second application based on the matching.

9. The system of claim 8, the at least one processor further configured to:

create a schema for the first tenant of the first application in a database service associated with the first tenant of the first application.

10. The system of claim 8, the at least one processor further configured to:

register a list of integration use-cases for the first application in the integration discovery service.

11. The system of claim 8, wherein the integration use-case for the first tenant of the first application represents an application programming interface (API) provided by the first tenant of the first application or an API to be consumed by the first tenant of the first application.

12. The system of claim 8, wherein the first tenant of the first application performs the integration-use case for the first tenant of the first application with the potential integration use-case for the second tenant of the second application based on the integration configuration.

13. The system of claim 8, wherein to create the integration configuration the at least one processor is configured to:

create a destination configuration for the first tenant of the first application for performing the integration-use case for the first tenant of the first application with the potential integration use-case for the second tenant of the second application based on the integration configuration.

14. The system of claim 8, wherein to match the integration use-case the at least one processor is configured to:

determine that the integration use-case for the first tenant of the first application is compatible with the potential integration-use case for the second tenant of the second application.

15. A non-transitory computer-readable device having instructions stored thereon that, when executed by at least one computing device, causes the at least one computing device to perform operations comprising:

creating a registration entry representing an integration use-case for a first tenant of a first application in an integration discovery service;

generating a barcode based on the registration entry;

matching the integration use-case for the first tenant of the first application with a potential integration use-case for a second tenant of a second application based on the barcode; and creating an integration configuration for enabling the integration use-case for the first tenant of the first application with the potential integration use-case for the second tenant of the second application based on the matching.

16. The non-transitory computer-readable device of claim 15, the operations further comprising:

creating a schema for the first tenant of the first application in a database service associated with the first tenant of the first application.

17. The non-transitory computer-readable device of claim 15, the operations further comprising:

registering a list of integration use-cases for the first application in the integration discovery service.

18. The non-transitory computer-readable device of claim 15, wherein the integration use-case for the first tenant of the first application represents an application programming interface (API) provided by the first tenant of the first application or an API to be consumed by the first tenant of the first application.

19. The non-transitory computer-readable device of claim 15, wherein the first tenant of the first application performs the integration-use case for the first tenant of the first application with the potential integration use-case for the second tenant of the second application based on the integration configuration.

20. The non-transitory computer-readable device of claim 15, the operations further comprising:

creating a destination configuration for the first tenant of the first application for performing the integration-use case for the first tenant of the first application with the potential integration use-case for the second tenant of the second application based on the integration configuration.

* * * * *